United States Patent [19]

Lynch

[11] 4,345,547
[45] Aug. 24, 1982

[54] CRATE CRIB ATTACHMENT

[75] Inventor: Michael D. Lynch, Burbank, S. Dak.

[73] Assignees: Delmar J. Lynch; John P. Lynch, both of Burbank, S. Dak.

[21] Appl. No.: 237,571

[22] Filed: Feb. 23, 1981

[51] Int. Cl.³ .............................................. A01K 1/02
[52] U.S. Cl. ........................................ 119/20; 119/27
[58] Field of Search ....................... 119/20, 15, 16, 17, 119/18, 19, 21, 22, 27, 51 R

[56] References Cited

U.S. PATENT DOCUMENTS

| 2,881,733 | 4/1959 | Young, Jr. et al. | 119/15 |
| 3,429,297 | 2/1969 | Schroer | 119/17 |
| 3,698,360 | 10/1972 | Rubricius | 119/17 |
| 3,721,213 | 3/1973 | Bruggeman | 119/17 |
| 4,173,947 | 11/1979 | Whiteside, Jr. | 119/18 |
| 4,202,292 | 5/1980 | Strickland | 119/20 |

FOREIGN PATENT DOCUMENTS

| 2156653 | 11/1971 | Fed. Rep. of Germany . | |
| 807533 | 1/1969 | United Kingdom . | |
| 657793 | 4/1979 | U.S.S.R. | 119/27 |

Primary Examiner—Hugh R. Chamblee
Attorney, Agent, or Firm—Merchant, Gould, Smith, Edell, Welter & Schmidt

[57] ABSTRACT

A crate crib attachment (10) is disclosed which is mounted by means of a plurality of adjustable mounting brackets (30) upon a topmost end portion of a farrowing crate (20). Baby piglets placed within the crib attachment are separated from the mother pig for safety purposes, yet remain in close proximity during their pre-nursery growth period.

11 Claims, 4 Drawing Figures

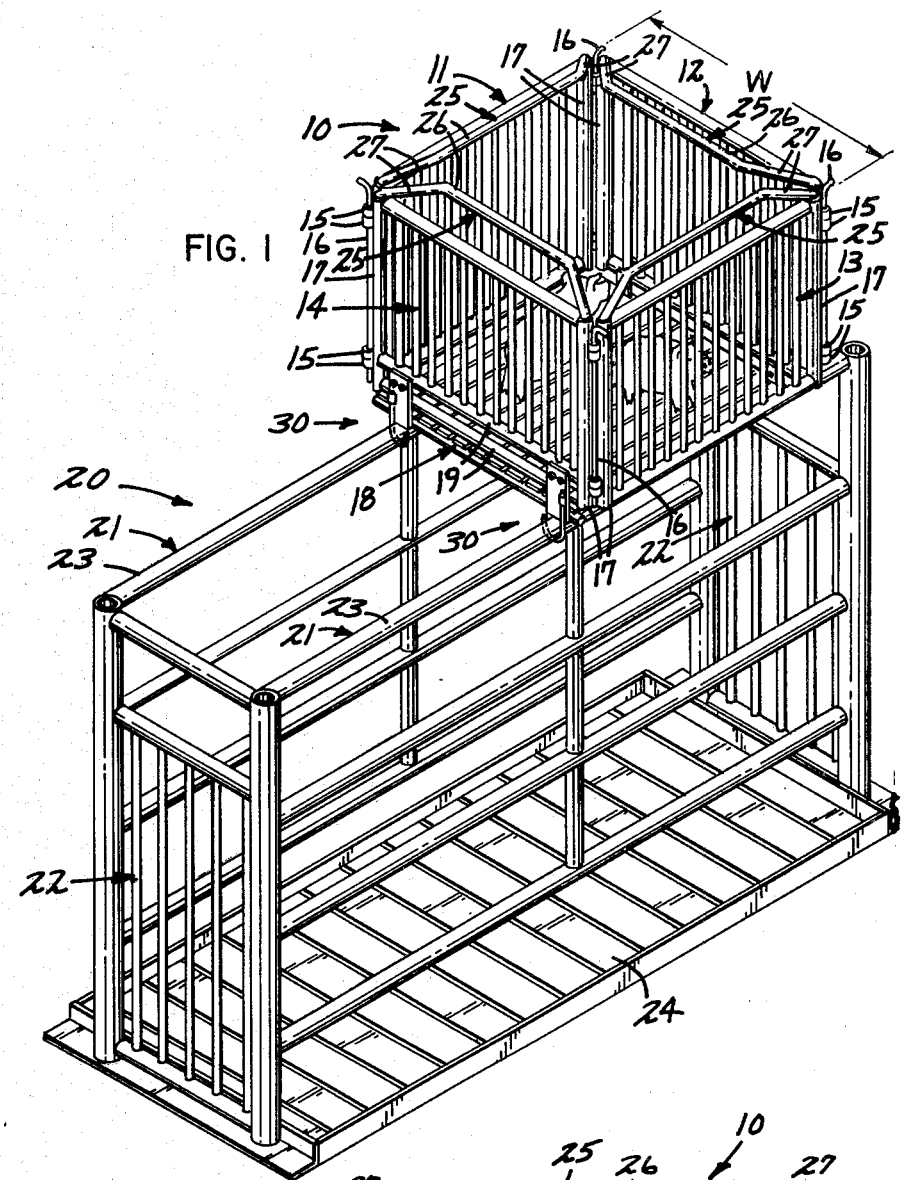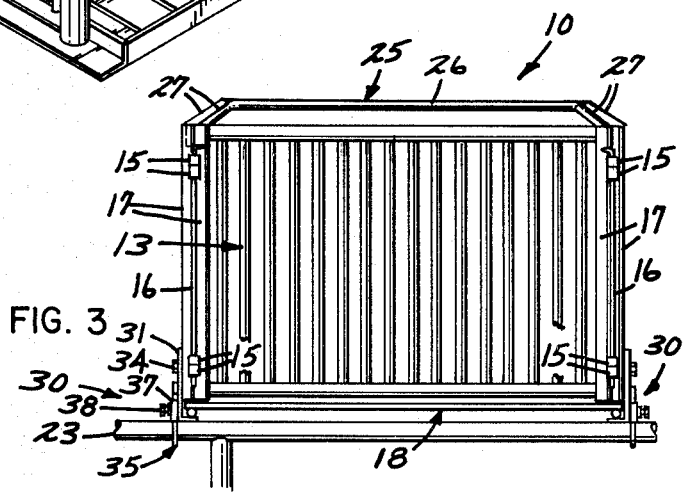

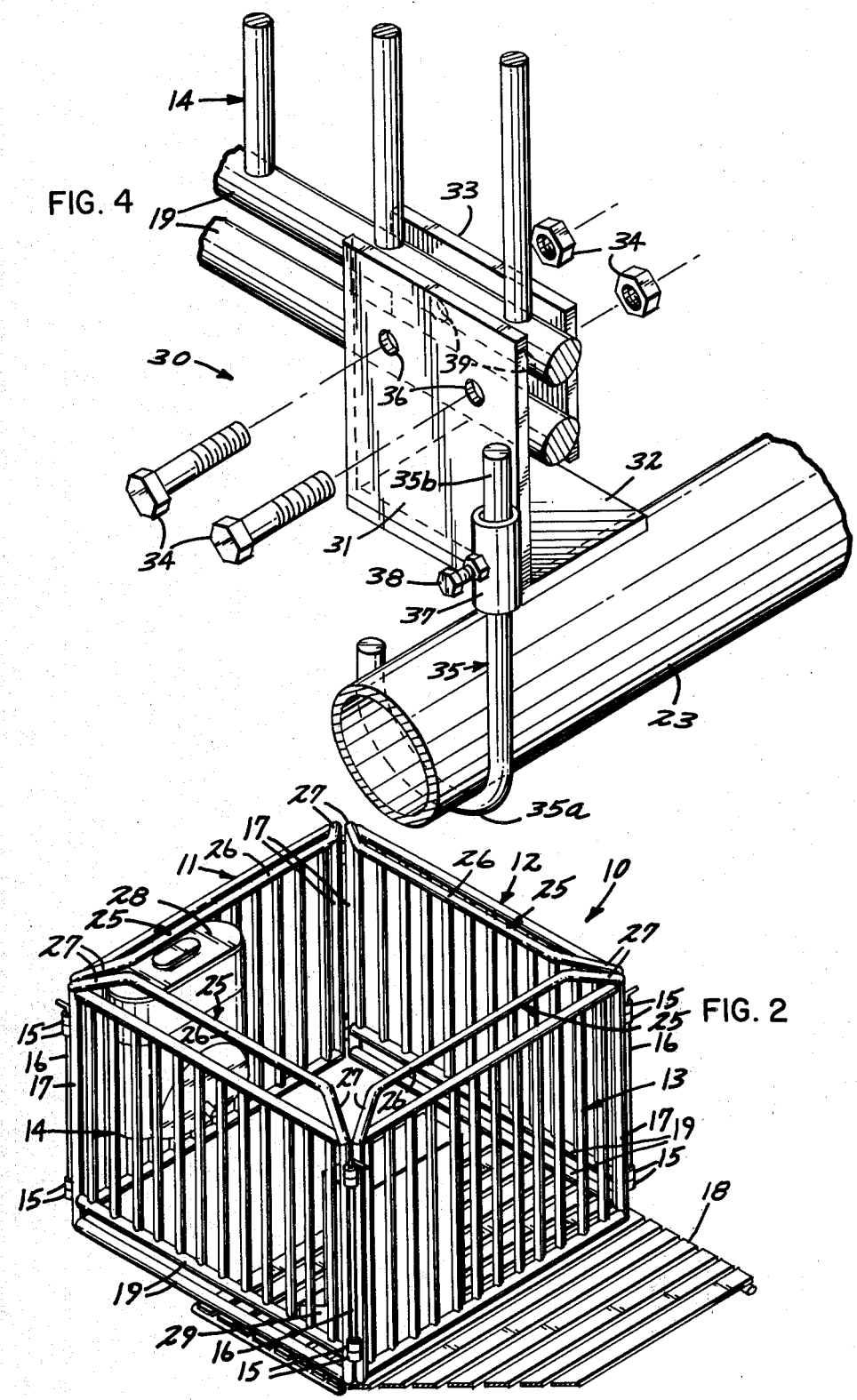

CRATE CRIB ATTACHMENT

TECHNICAL FIELD

The present invention relates to farrowing devices and more particularly to a crib structure mounted atop a farrowing pen to separate baby piglets from a mother pig in the pre-nursery period of growth.

BACKGROUND OF THE INVENTION

The first ten days of life are the critical survival period for baby piglets. Accordingly, it is important to protect the piglets from the hazards of the farrowing pen and the mother pig until the piglets each weigh approximately thirteen pounds or are three weeks old. Prior art devices have not answered this specific need.

Most of the prior art devices have concentrated on providing confinement units or cages for weaned pigs in the nursery or post-nursery stage of development. Such devices however, are unsuitable for the needs of the farrowing house. The present invention provides a structure and method which answers the need to protect the baby piglets during the critical growth period while keeping the piglets in close proximity to the mother pig for feeding purposes.

SUMMARY OF THE INVENTION

The present invention combines a crate crib attachment with a farrowing crate. The farrowing crate has the standard construction of upstanding wall members defining an interior space therebetween. The crate crib attachment is proportionately smaller than the farrowing crate with corresponding upstanding side walls and a removable floor member. It is mounted to the farrowing crate by means including a plurality of adjustable mounting brackets which secure a lowermost portion of a pair of crib attachment side walls to a respective topmost portion of the farrowing crate.

According to one aspect of the present invention, there is provided a method for separating pre-nursery piglets from the mother pig while maintaining them in close proximity for feeding purposes.

According to another aspect of the present invention, a separate but close proximity is maintained between the baby piglets and the mother pig through use of a crate crib attachment secured to a top part of the farrowing crate at an end of the crate containing the posterior of the mother pig. The crate crib attachment is securely fixed to the farrowing crate in a manner preventing the mother pig from upsetting the arrangement.

A further aspect of the present invention provides a crate crib attachment having mounting means which can be adjusted to accommodate the varying widths of different farrowing units.

A still further aspect of the present invention provides a method for protecting baby piglets while encouraging the self-feeding of the piglets within the crib attachment upon hearing the sound of other suckling piglets in the farrowing crate with the lactating mother pig.

BRIEF DESCRIPTION OF THE DRAWINGS

FIG. 1 is a perspective view of the present invention.

FIG. 2 is a perspective view of a portion of the present invention with parts broken away and removed therefrom.

FIG. 3 is a side elevational view of a portion of the present invention.

FIG. 4 is an exploded perspective view of a portion of the present invention

DETAILED DESCRIPTION OF THE PREFERRED EMBODIMENT

Refer now to the drawings, wherein like reference numerals will be used to identify the same or corresponding elements throughout the several views. FIG. 1 illustrates the present invention wherein a crate crib attachment 10 is mounted upon a farrowing crate 20 by a plurality of adjustable mounting means 30.

The farrowing crate 20 is of standard construction for housing a mother pig during the birth of the litter. Generally, a floor 24 is provided; however, the floor of the building itself (not shown) often serves as the floor of the farrowing unit or crate. In the preferred embodiment, the farrowing crate is shown with a slatted floor 24 of rectangular shape with two pairs of upwardly projecting, opposing wall members 21, 22 interconnected to each other to define an interior space therebetween. One pair of wall members 21 is substantially greater in length than the second pair, or end pair, 22. The structure 20 is designed to be large enough to comfortably house a farrowing sow and her newborn piglets but is sufficiently narrow to prevent the sow from turning around. In the preferred embodiment, the longer pair of opposing wall members 21 are each provided with a top rail member 23 at their topmost portions. The purpose of the top rail members 23 will be discussed hereinafter. It is to be understood, however, that various types of farrowing structures of standard construction could be readily used in the present invention such as free stalls or conventional pens. The invention is not limited to the use of the particular farrowing structure illustrated in FIG. 1.

The crate crib attachment 10, as can be seen in FIG. 1, has a generally square shape. The width, W, of the crate crib attachment is comparable to the length of the shorter side wall members 22 of the farrowing crate 20 for mounting purposes. The crib attachment length and height are generally proportional to those of the farrowing crate 20. Two pairs of side walls 11, 13 and 12, 14, define the interior space of the crib attachment. The side walls of the preferred embodiments have an open-bar construction (i.e., spaced vertically extending bars); however, those skilled in the art will appreciate that several other types of wall construction would be suitable for the purpose of containing baby piglets. Each side wall 11, 12, 13, 14 has, at opposite ends, a pair of tubular, upright end members 17. Each upright end member 17 has a downwardly extending interior opening in its uppermost portion for purposes to be discussed below. Welded along a side of each upright end member 17 are a pair of cylindrical rod pin guides 15, e.g., open-rings, with one guide being located near the uppermost area of the member 17 and the other guide being located near the lowermost area of the member. The rod pin guides are located so that adjacent upright members 17 of adjacent side walls, e.g. 13, 14, have their upper and lower rod pin guides axially aligned with respect to each other as illustrated in FIG. 1. This way, the side walls 11, 12, 13, 14 can be connected together by aligning pairs of adjacent uppermost and lowermost pin guides 15 and inserting a rod pin 16 down through both sets of the paired guides thereby securing respective adjacent side walls generally normal to each other. The final side wall configuration of the crib attachment 10 is that of a parallelogram.

One pair of the crib attachment's side walls, 12, 14, are designed with a lowermost portion of each side wall having a pair of horizontally extending, vertically spaced apart rod members 19. Each rod member extends substantially the full width, W, of its side wall and is connected at its ends to respective upright end members 17. The uppermost rod member 19 is connected to the bottom ends of the vertical bars forming the side wall. The remaining side walls generally have lowermost portions with only one horizontally extending rod member which is secured to the bottom ends of the vertical bars. The purpose for the pairs of spaced apart rod members 19 will be discussed hereinafter.

Referring now to FIG. 2, it is preferable to install in each crate crib attachment 10, a waterer 28 and creep feeder 29, usually on opposite side walls. Jump-stop frames 25 above each side wall 11, 12, 13, 14 are also included in the preferred embodiment. Each jump-stop frame 25 has a central portion 26 which extends parallel to the top bar of the side wall. Projecting downwardly and outwardly from opposite ends of the central portion 26 are legs 27. Each leg 27 is designed to fit snugly into the uppermost opening of a respective side wall end member 17, thereby securing the jump-stop frame member 25 in its position above the side wall. As can be seen in the drawings, the jump-stop frames 25 extend not only up over the crate crib attachment 10, but also extend inwardly over the interior space defined by the four side walls 11, 12, 13, 14. The jump-stop frames prevent the baby pigs within the crib attachment 10 from jumping out over the side walls.

A rectangular floor 18, made of any suitable material such as slatted steel members or wire mesh is also provided for the crib attachment 10. In the preferred embodiment, the floor 18 is not permanently connected to the crib attachment side walls. As illustrated in FIG. 2, the floor 18 is removable from the assembled crib attachment 10, along the bottom of a side not having a pair of rod members 19, e.g., 11, 13. The support of the floor 18 within the crib attachment is provided by the mounting means 30, a discussion of which follows.

The crate crib attachment 10 is secured to a top portion of the farrowing crate 20 at a location on the crate near or at the end of the crate designed to contain the posterior of the mother pig. The width W of the crate crib 10, as stated above, is substantially equal to the length of the shorter wall member 22 of the farrowing crate 20 even though the overall size of the crate crib attachment is otherwise proportionately smaller than the farrowing crate. The crib attachment is situated atop the farrowing crate directly upon the pair of top rail members 23. A plurality of mounting brackets 30 are used to fix the relative positions.

As shown in FIG. 4, each mounting bracket is comprised of several parts. The central part is a side member 31 of generally rectangular shape and flat-surfaced on both its sides with an upper portion of the side member having a pair of spaced apart apertures 36 therethrough. A base member 32 projects generally perpendicular from the lowermost end of the side member 32 and also has a substantially rectangular, flat-surface construction. A separate backing member 33, approximately one-half the size of the side member, is also a flat-surfaced piece and has a pair of spaced apart apertures 39 extending therethrough. The pairs of apertures 36, 39 of both the side member 31 and the backing member 33 are designed for alignment with each other in order to receive respective connecting means 34, e.g., a nut and bolt combination. As can be seen in FIG. 4, a portion of a respective side wall's pair of rod members 19 is located between the side member 31 and the backing member 33 with the pairs of apertures located intermediate the rod members. The connecting means 34 inserted through the apertures secures the crib attachment side wall within the mounting bracket. This type of mounting bracket allows the placement of the crib attachment upon farrowing crates of varying sizes as the pair of mounting brackets 30 can be moved along the entire length of the side wall's pair of rod members and secured at the desirable locations which match the width of the farrowing crate.

Each mounting bracket further includes a J-shaped hook member 35 and a tubular member 37 attached at the lower right hand corner of the side member 31. The hook member 35 extends downwardly below the mounting bracket. Each hook member has a lower first end 35a which forms the hook portion of the member 35 and is designed to curve around and hold a portion of a respective top rail member 23 as shown in FIG. 4. An upper, straight second end 35b passes through the tubular member 37. The second end 35b is fixed at a point along its length inside the tubular member 37 by appropriate means 38 such as a set screw arrangement shown in the preferred embodiment. It can be understood that this aspect of the mounting bracket is also adjustable as any portion of the length of the hook member's second end 35b can be secured within the tubular member by the set screw arrangement.

When the side walls 11, 12, 13, 14 have been properly connected to each other and the jump-stop frames 25 installed, the crib attachment 10 is placed upon the farrowing crate 20 at the end of the crate containing the posterior of the mother pig. The side walls 12, 14 having the rod member pairs 19 are situated parallel to the shorter wall members 22 of the farrowing crate. A mounting bracket 30 is then placed on the portion of the rod member pair 19 located directly above the respective adjacent top rail member 23. The side wall portion is then fixedly secured by the portion held between the side member 31 and the backing member 33 of the mounting bracket. Subsequently, the hook member 35 for that particular mounting bracket assembly is positioned so that a segment of the top rail member 23 is engaged in the hook end 35a as the second end 35b is extended through the tubular member 37. When the top rail member 23 is snugly resting in the hook end 35a, the set screw is tightened to fix the second end 35b of the hook member 35 within the mounting bracket assembly. This procedure is repeated for all four of the mounting brackets. The final positions of the mounting brackets in the preferred embodiment can be seen in FIG. 1. FIG. 3 illustrates that the placement of the mounting brackets along side wall 12 is but a mirror image of the bracket placement along side wall 14 seen in FIG. 1. The floor 18 of the crate crib attachment is finally inserted into the crib attachment along the bottom of a side wall 11, 13. The base members 32 of the brackets support the floor 18 at its four corners. It is noted that base members 32 extend inwardly and are spaced a sufficient distance below lowermost rod 19 to accommodate floor 18 therebetween.

After the positioning of the crib attachment 10 and securely mounting it upon the farrowing crate 20, the baby pigs are then placed within it safe from the dangers of the farrowing crate, yet remaining close to the mother pig. The present invention provides significant benefits. There is the obvious result of preventing the mother pig from somehow destroying the baby piglets, which is a frequent occurrence when they are left in the farrowing crate with the mother pig. The crib attachment can be used to separate out and carefully nurture, by use of the waterer and creep feeder, crippled or weak pigs of the litter or the "extra" baby pigs born in an oversized litter which cannot all be fed by the mother. Further, the positioning of the crib attachment is important for two reasons: (1) to prevent the mother pig from upsetting it by knocking it with her snout or head, and (2) to allow a source of higher heat within the farrowing house to reach the pigs which would not be possible if the baby pigs were kept on the floor with the mother. And not the least of the benefits being the encouragement to feed given the piglets within the crate crib attachment by the sound of other baby pigs suckling the mother pig below. In this way, the entire litter thrives whether they feed directly from the mother pig or feed from the artificial sources within the crib attachment.

The present invention thus provides a structure and a method which helps newborn pigs survive their pre-nursery stage of development. After approximately three weeks or after reaching an average weight of about thirteen pounds, the baby pigs are removed from the farrowing location, and the crate crib attachment is then ready for use with a new litter.

What is claimed is:

1. In combination:
   (a) a farrowing crate, said crate including a plurality of upwardly extending wall members defining an interior space therebetween;
   (b) a crate crib attachment for newborn animals, said attachment being proportionally smaller than said farrowing crate and having a floor and a plurality of upwardly extending side walls defining a containing space therebetween, said plurality of side walls including a pair of opposing side walls having lowermost portions defined by a pair of spaced apart rod members each extending across the width of said respective side wall; and
   (c) means for mounting said crib attachment to a topmost portion of said farrowing crate to keep the newborn animals contained in said crib attachment in close proximity to a mother animal located in said farrowing crate, said mounting means including a plurality of mounting brackets each having means for securing a respective portion of said rod member pair to said mounting bracket, including means for attaching said mounting bracket to a segment of said farrowing crate topmost portion.

2. The combination according to claim 1 wherein said attaching means includes a downwardly extending hook member, said hook member having a first end comprising hook means for engaging said segment of said farrowing crate topmost portion and a second end extending through a tubular member attached to said mounting bracket, said tubular member having a set screw means for adjustably holding said hook member within said tubular member.

3. The combination according to claim 1 wherein said crate crib attachment further includes jump-stop frames, each jump-stop frame being removably secured to a respective side wall, said jump-stop frames each extending upwardly away from said side wall and generally inwardly over said containing space to prevent newborn animals within said crib attachment from jumping over said side walls.

4. In combination:
   (a) a farrowing crate, said crate including a plurality of upwardly extending wall members defining an interior space therebetween, said plurality of wall members including at least one top rail member extending horizontally along a topmost portion of each of two opposing side wall members;
   (b) a crate crib attachment for newborn animals, said attachment being proportionately smaller than said farrowing crate and having a floor and a plurality of upwardly extending side walls defining a containing space therebetween; and
   (c) means for mounting said crib attachment to a topmost portion of said farrowing crate to keep the newborn animals contained in said crib attachment in close proximity to a mother animal located in said farrowing crate, said mounting means comprising a plurality of hook members, said hook members constructed to engage said top rail members of said farrowing crate for securement of said crib attachment to said farrowing crate.

5. The combination according to claim 4 wherein said mounting means further includes a plurality of mounting brackets, said brackets including said hook members adjustably secured thereto; said brackets constructed to engage a portion of said crib attachment side walls and fix said crib attachment to said topmost portion of said farrowing crate.

6. The combination according to claim 4 wherein said topmost end portion of said farrowing crate is part of that portion of the farrowing crate designed to be occupied by the posterior of the mother animal.

7. A crib attachment for a farrowing structure, comprising:
   (a) a plurality of side walls, including means for removably securing adjacent side walls to each other, a pair of said side walls opposing each other and having lowermost portions defined by a pair of spaced apart rod members, each rod member extending the width of said respective side wall;
   (b) a removable, slatted floor adapted for insertion into and removal from said crib attachment at a side wall not having said pair of rod members; and
   (c) means for mounting said crib attachment to said farrowing structure, said means including a plurality of mounting brackets, each of said brackets including a generally upwardly extending side member and a base member extending generally normal thereto, means for securing said side member of each bracket to a portion of a respective pair of rod members with said base members positioned to provide support for said floor, and means for attaching each said bracket to a topmost portion of a farrowing structure.

8. The crib attachment according to claim 7 wherein each said means for securing said side member to said rod member pair includes a backing member, said backing member and said side member each having portions with apertures therein, said respective portion of said rod member pair being disposed between said backing member and said side member with said apertures being aligned and located intermediate said rod member pair, said rod members being securely fixed within said mounting bracket by connecting means extending through said aperture portions.

9. The crib attachment according to claim 7 wherein said bracket attaching means includes a downwardly extending hook member, said hook member having a first end comprising hook means for engaging a portion of the farrowing structure and a second end extending through a tubular member attached to said side member, said tubular member having a set screw arrangement for adjustably holding said hook member to said bracket side member.

10. The crib attachment according to claim 7 further including a plurality of jump-stop frames, each said jump-stop frame designed to be mounted to a respective side wall, said jump-stop frames extending generally upwardly and inwardly so as to prevent animals with said crib attachment from jumping out of said crib attachment.

11. The crib attachment according to claim 10 wherein each of said side walls includes opposing tubular end members, each of said members having an uppermost end portion having an opening therein, and each of said jump-stop frame includes a central portion extending substantially parallel to a respective side wall and a pair of legs extending downwardly and generally outwardly from opposite ends of said central portion, said legs being constructed and arranged to extend into respective tubular end member opening securing said jump-stop frame to said respective wall.

* * * * *